(12) United States Patent
Kompella et al.

(10) Patent No.: US 8,611,359 B1
(45) Date of Patent: Dec. 17, 2013

(54) SCALING MPLS ACROSS AREAS OF AN AUTONOMOUS SYSTEM USING LABELED INTERIOR BORDER GATEWAY PROTOCOL

(75) Inventors: Kireeti Kompella, Los Altos, CA (US); Nischal Sheth, Los Altos, CA (US); Shivani Aggarwal, San Francisco, CA (US); Yakov Rekhter, New Rochelle, NY (US)

(73) Assignee: Juniper Networks, Inc., Sunnyvale, CA (US)

( * ) Notice: Subject to any disclaimer, the term of this patent is extended or adjusted under 35 U.S.C. 154(b) by 891 days.

(21) Appl. No.: 12/626,221

(22) Filed: Nov. 25, 2009

Related U.S. Application Data (60) Provisional application No. 61/238,502, filed on Aug. 31, 2009.

(51) Int. Cl.
*H04L 12/28* (2006.01)

(52) U.S. Cl.
USPC .......................................... 370/401

(58) Field of Classification Search
None
See application file for complete search history.

(56) References Cited

U.S. PATENT DOCUMENTS

| | | | |
|---|---|---|---|
| 7,184,437 B1 | 2/2007 | Cole et al. | |
| 7,483,387 B2 * | 1/2009 | Guichard et al. | 370/252 |
| 7,489,695 B1 * | 2/2009 | Ayyangar | 370/396 |
| 7,522,600 B1 | 4/2009 | Aggarwal et al. | |
| 7,564,806 B1 | 7/2009 | Aggarwal et al. | |
| 7,616,574 B2 * | 11/2009 | Previdi et al. | 370/238 |
| 7,664,877 B1 * | 2/2010 | Sheth | 709/242 |
| 7,855,953 B2 * | 12/2010 | Filsfils et al. | 370/228 |
| 7,865,615 B2 * | 1/2011 | Mirtorabi et al. | 709/242 |
| 2002/0083174 A1 * | 6/2002 | Hayashi et al. | 709/225 |
| 2007/0258447 A1 * | 11/2007 | Raszuk et al. | 370/389 |
| 2009/0168780 A1 * | 7/2009 | Unbehagen et al. | 370/392 |
| 2010/0040069 A1 * | 2/2010 | Johri et al. | 370/400 |

OTHER PUBLICATIONS

G. Wright, et al., "CR-LDP Extensions for Interworking with RSVP-TE", draft-wright-mpls-crldp-rsvpte-iw-00.txt, MPLS Working Group, The Internet Society, Mar. 2000.*

Ronald Davis, "A Framework for a Peer Gatekeeper Routing Protocol", draft-ietf-iptel-pgrp-framework-00.txt, The Internet Society, Nov. 20, 1998.*

D. Awduche, et al., "RSVP-TE: Extensions to RSVP for LSP Tunnels", RFC 3209, Network Working Group, The Internet Society, Dec. 2001.*

U.S. Appl. No. 12/425,503, filed Apr. 17, 2009, entitled "Egress Protection for Label Switched Paths".

(Continued)

*Primary Examiner* — Dang Ton
*Assistant Examiner* — Ronald H Davis
(74) *Attorney, Agent, or Firm* — Shumaker & Sieffert, P.A.

(57) ABSTRACT

Techniques are described for scaling Multiprotocol Label Switching (MPLS) across areas of an autonomous system using a labeled interior Border Gateway Protocol (iBGP). A method includes executing a first label distribution protocol at a border node at a border between two of a plurality of interior gateway protocol (IGP) areas of a single autonomous system (AS), and exchanging label distribution messages using the first label distribution protocol to establish a first intra-area label switched path (LSP) within a first one of IGP areas. The method also includes executing a labeled interior border gateway protocol at the border node, and exchanging label distribution messages using the labeled interior border gateway protocol to establish a hierarchical inter-area LSP that runs over the previously established first intra-area LSP, wherein the hierarchical inter-area LSP extends across the plurality of IGP areas of the AS.

37 Claims, 7 Drawing Sheets

(56) References Cited

OTHER PUBLICATIONS

U.S. Appl. No. 12/246,810, filed Oct. 7, 2008, entitled "Inter-Autonomous System (AS) Virtual Private Local Area Network Service (VPLS)".

Le Roux et al., "Fast Reroute in MPLS L3VPN networks Towards CE-to-CE Protection," www.mpls2006.com, 2006, 10 pp.

Rekhter, "Carrying Label Information in BGP-4," Network Working Group, RFC 3107, May 2001, 9 pp.

Decraene et al., LDP Extension for Inter-Area Label Switched Paths (LSPs), Network Working Group, RFC 5283, Jul. 2008, 12 pp.

Aggarwal et al., "MPLS Upstream Label Assignment and Context-Specific Label Space," Network Working Group, RFC 5331, Aug. 2008, 14 pp.

Kompella et al., "Virtual Private LAN Service (VPLS) Using BGP for Auto-Discovery and Signalling," Network Working Group, RFC 4761, Jan. 2007, 29 pp.

Swallow et al., "Network Scaling with Aggregated IP LSPs," Network Working Group, Jul. 2007, 11 pp.

\* cited by examiner

SCALING MPLS ACROSS AREAS OF AN AUTONOMOUS SYSTEM USING LABELED INTERIOR BORDER GATEWAY PROTOCOL

This application claims the benefit of U.S. Provisional Application No. 61/238,502, filed Aug. 31, 2009, the entire contents of which are incorporated by reference herein.

TECHNICAL FIELD

The invention relates to computer networks and, more particularly, to scalable routing and forwarding of packets within computer networks.

BACKGROUND

Routing devices within a network, often referred to as routers, maintain routing information bases (RIBs) of routing information that describe available routes through the network. Upon receiving an incoming packet, the router examines information within the packet and forwards the packet in accordance with the routing information. In order to maintain an accurate representation of the network, routers exchange routing information in accordance with one or more defined routing protocols.

When using a link-state interior gateway protocol (IGP), such as the Open Shortest Path First protocol (OSPF) or Intermediate System to Intermediate System protocol (IS-IS), each router possesses information about the complete topology of the network within which it resides. As a network grows large, scaling within the network may be necessary to manage the amount of network topology information exchanged by routers in the network. Link-state IGP, such as IS-IS or OSPF, addresses network scaling issues by hierarchically separating a network into multiple hierarchical regions (e.g., "areas" or "levels") so as to increase routing scalability. For example, OSPF areas or IS-IS levels may be used to hierarchically partition the network into distinct regions, such as a backbone area that includes core routers, and one or more non-backbone areas. OSPF and IS-IS allow an autonomous system to, for example, be partitioned into different regions so as to increase routing scalability within a routing domain. Any IGP regions within the partitioned network need only maintain link state for the routers within the respective area. In this way, each of the IGP regions may be viewed as a separate routing domain within the partitioned network, and link state information need not generally be exchanged between all of the routers of different regions, thus reducing the link-state information in the RIB maintained by each of the routers.

Using an IGP that employs such hierarchical scaling, each router in a given network region stores both topological and reachability information for only other devices in the same region, and maintains only reachability information for all other regions in the network. In some cases, network scaling may alternatively or additionally be addressed by IGPs by aggregation of network address prefixes. That is, a router carries network addresses in complete form (often referred to as "/32" or host addresses) for routers that are located within the same network region, and maintains aggregated network address prefixes (i.e., less than full network addresses, such as "/16" prefixes) to represent other regions within the network.

One mechanism for carrying network traffic through a network is Multi-protocol Label Switching (MPLS). MPLS works by prefixing a network packet with an MPLS header that contains a stack of one or more "labels." Label switching routers (LSRs) forward network traffic based on the labels carried by the packets. Using MPLS, the LSRs can distribute labels and establish paths through the network, i.e., Label Switched Paths (LSPs). An LSP defines a distinct path through the network to carry MPLS packets from a source device to a destination device. Each router along an LSP allocates a label and propagates the label to an upstream router along the path for subsequent affixing to network traffic to form MPLS packets to be forwarded along the path. LSRs along the path cooperatively perform MPLS operations to forward the MPLS packets along the established path. A short label associated with a particular LSP is initially affixed to packets that are to travel through the network via the LSP, and that label may be replaced with subsequent labels at each LSR along the path.

A label distribution protocol such as the Label Distribution Protocol (LDP), targeted LDP, or the resource reservation protocol with traffic engineering extensions (RSVP-TE) may be used for distributing labels and establishing LSPs within a network. Using LDP, for example, a router may output control-plane LDP label mapping messages to advertise a label to neighboring routers for subsequent use in sending traffic to a particular destination associated with the advertising router.

LDP requires that network address specified in the LDP label mapping message exactly match a network address contained within the RIB maintained by the router. Therefore, if LDP were used to establish an LSP between LSRs in different IGP areas/levels, the specific (e.g., the exact/32 for IPv4) loopback addresses of all the LSRs are redistributed across all IGP areas. This generally requires "route leaking" between the LSRs (i.e., use of a routing protocol for the exchange of routing information that otherwise would not be exchanged) so that inter-area routes and network addresses are "leaked" into the RIB of each LSR along the LSP. This can greatly expand the size of the RIB maintained by each of the LSR in order to support LDP across IGP areas (routing domains). This can become a barrier to effective network scaling when an IGP is used across multiple areas. For example, use of LDP for MPLS forwarding across IGP regions would otherwise require LSRs within the network to maintain a large amount of routing state, which defeats much of the benefits of IGP scaling by way of hierarchical areas or levels. Moreover, many network service providers regard route leaking as both a scalability issue as well as an operational problem. RSVP-TE supports "hierarchical" LSP creation. However, this technique only reduces the control and data plane state in some of the nodes, and does not reduce the total number of LSPs required, which can be very large (i.e., N*(N−1) LSPs are needed to fully interconnect N nodes in a network.)

SUMMARY

In general, techniques are described for scaling Multiprotocol Label Switching (MPLS) across different areas of the same autonomous system (AS) using a labeled interior Border Gateway Protocol (iBGP). That is, iBGP is used as an inter-region label distribution protocol where the regions are different interior gateway protocol (IGP) areas of a single AS. In particular, techniques are described for using labeled iBGP to distribute a <FEC, Label> mapping across IGP area boundaries for label switched paths (LSPs) that span multiple IGP areas within an AS. According to the techniques described herein, LSPs that span multiple IGP areas within an AS are carried over intra-area LSPs that exist within each area. The techniques allow for scaling when MPLS is extended from a wide area network (WAN) into a metro or access network.

Extending MPLS into the metro/access network in this way can provide edge-to-edge connectivity to connect a first access node of a first access network to a second access node of a second access network through a core network. Such edge-to-edge connectivity may be needed for providing particular services to access networks.

The techniques allow for decomposing edge-to-edge connectivity into a collection of connectivity segments, which facilitates partitioning the entire MPLS infrastructure into a collection of regions (e.g., IGP areas, ASes). Partitioning the MPLS infrastructure into a collection of IGP areas and/or ASes facilitates control plane scaling, as it reduces the amount of control plane information that individual nodes have to handle. Partitioning the MPLS infrastructure into a collection of IGP areas and/or ASes also facilitates the establishment of an LSP hierarchy, which facilitates both control and data plane scaling, as it reduces the amount of both control plane and data plane information that individual nodes have to handle. A large network may include 10,000 to 100,000 nodes, which mandates highly scalable solutions.

Extending MPLS into the metro/access networks may result in greater diversity in the type of devices that form MPLS infrastructure. For example, rather than just Provider Edge (PE) routers and Provider (P) routers in the MPLS infrastructure, the MPLS infrastructure may be expanded to include PE routers, P routers, digital subscriber line access multiplexers (DSLAMs), multi-tenant units (MTUs), cell-site gateways (CSGs), optical line terminals (OLTs), and other devices. Decomposing edge-to-edge connectivity into a collection of connectivity segments helps to deal with the greater diversity of device types by allowing different connectivity segments to use different control plane components to establish intra-segment connectivity, and also may enable a reduction of control and data plane overhead on devices with limited control and/or data plane capabilities. For example, not all devices may have dynamic control plane capabilities, and devices that do have dynamic control plane capabilities may support only a subset of control plane protocols (e.g., LDP only). As another example, some devices may be able to support only a limited number of LDP sessions. Moreover, certain devices may have constraints on aspects such as the size of a Label Forwarding table (LFIB), a number of labels to push, number of labels to pop, and replication (e.g., for point-to-multipoint LSPs). The techniques described herein allow for extending MPLS into the metro/access networks, which can provide the ability to offer services over a greater variety of access media.

Consistent with the techniques described herein, different IGP areas within the same AS may use different intra-area label distribution protocols. For example, one IGP area may use RSVP-TE for establishing intra-area LSPs, while another IGP area may use LDP for establishing intra-area LSPs. This allows different IGP areas to use label distribution protocols that are tailored to the needs of the IGP areas.

As described herein, iBGP is used internally within an AS as an inter-area label distribution protocol to carry <FEC, label> mappings only for interior routes between different areas of the AS. The techniques therefore do not require that service providers carry exterior routes within a core area of an AS, thereby maintaining an "exterior-routing free core," if so desired. Label switching routers (LSRs) that interconnect regions, e.g., IGP areas, are referred to herein as Border Nodes (BNs). LSRs that apply services are referred to herein as Service Nodes (SNs).

In one embodiment, a method includes executing a first label distribution protocol at a border node positioned at a border between two of a plurality of interior gateway protocol (IGP) areas of a single autonomous system (AS), and exchanging label distribution messages using the first label distribution protocol to establish a first intra-area label switched path (LSP) within a first one of the plurality of IGP areas. The method also includes executing a labeled interior border gateway protocol at the border node, and exchanging label distribution messages using the labeled interior border gateway protocol to establish a hierarchical inter-area LSP that runs over the previously established first intra-area LSP, wherein the hierarchical inter-area LSP extends across the plurality of IGP areas of the AS.

In another embodiment, a border node includes a physical interface for receiving packets from a network, a control unit, a packet forwarding engine configured to maintain forwarding information that associates network destinations with next hops in the network, and a first label distribution protocol executing on the control unit, wherein the first label distribution protocol is configured to exchange label distribution messages to establish a first intra-area label switched path (LSP) within a first interior gateway protocol (IGP) area of a plurality of IGP areas of a single autonomous system (AS). The border node also includes a labeled interior border gateway protocol executing on the control unit, wherein the labeled interior border gateway protocol is configured to exchange label distribution messages to establish a hierarchical inter-area LSP that runs over the previously established first intra-area LSP, wherein the hierarchical inter-area LSP extends across the plurality of IGP areas of the AS.

In a further embodiment, a service node includes a physical interface for receiving packets from a network, a control unit, and a packet forwarding engine configured to maintain forwarding information that associates network destinations with next hops in the network. The service node also includes a first label distribution protocol executing on the control unit, wherein the first label distribution protocol is configured to exchange label distribution messages to establish a first intra-area label switched path (LSP) within a first interior gateway protocol (IGP) area of a plurality of IGP areas of a single autonomous system (AS). The service node further includes a labeled interior border gateway protocol executing on the control unit, wherein the labeled interior border gateway protocol is configured to generate a label distribution message to initiate establishment of a hierarchical inter-area LSP that runs over the previously established first intra-area LSP, wherein the hierarchical inter-area LSP extends across the plurality of IGP areas of the AS.

In another embodiment, the invention is directed to a computer-readable medium containing instructions. The instructions cause a programmable processor to execute a first label distribution protocol at a border node positioned at a border between two of a plurality of interior gateway protocol (IGP) areas of a single autonomous system (AS), exchange label distribution messages using the first label distribution protocol to establish a first intra-area label switched path (LSP) within a first one of IGP areas, execute a labeled interior border gateway protocol at the border node, and exchange label distribution messages using the labeled interior border gateway protocol to establish a hierarchical inter-area LSP that runs over the previously established first intra-area LSP, wherein the hierarchical inter-area LSP extends across the plurality of IGP areas of the AS.

In a further embodiment, a system includes a first service node within a first interior gateway protocol (IGP) area of a plurality of IGP areas of a single autonomous system (AS), and a first border node in communication with the first service node, wherein the first border node is positioned at a border between the first IGP area and a second IGP area of the plurality of IGP areas. The first border node includes a physical interface for receiving packets from the first service node and outputting packets to the first service node, a control unit, a packet forwarding engine configured to maintain forwarding information that associates network destinations with next hops in the network, and a first label distribution protocol executing on the control unit, wherein the first label distribution protocol is configured to exchange label distribution messages with the first service node to establish a first intra-area label switched path (LSP) to the first service node. The first border node also includes a labeled interior border gateway protocol executing on the control unit, wherein the labeled interior border gateway protocol is configured to exchange label distribution messages with the first service node to establish a hierarchical inter-area LSP that runs over the previously established first intra-area LSP, wherein the hierarchical inter-area LSP extends across the plurality of IGP areas of the AS.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
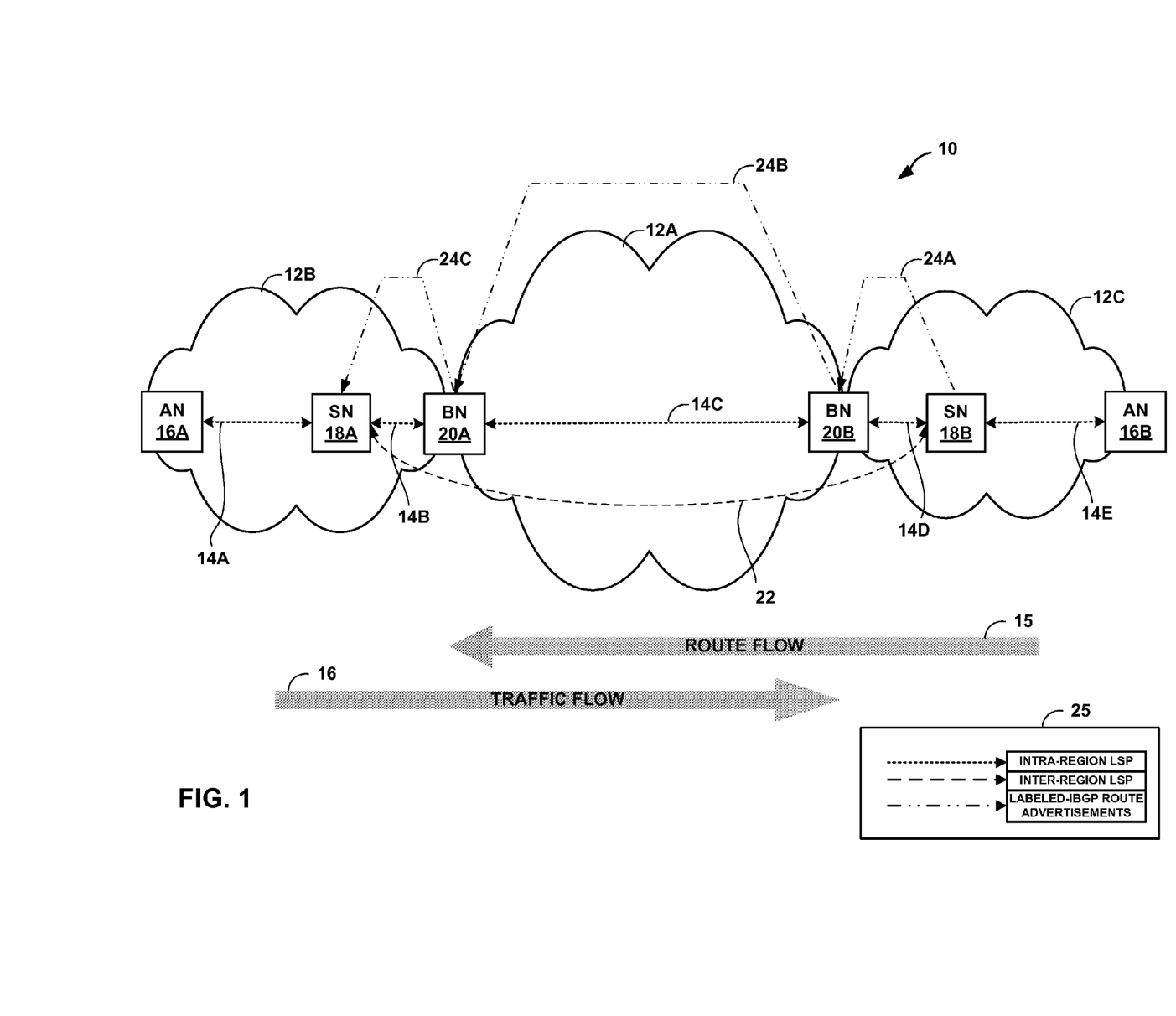
FIG. 1 is a block diagram illustrating an example autonomous system in which an inter-area LSP is established that extends from a first area into one or more other areas of the autonomous system.

FIG. 1 is a block diagram illustrating an autonomous system (AS) 10 that represents a single network domain that has been partitioned into a first Interior Gateway Protocol (IGP) area 12A that comprises a core or backbone area, and IGP areas 12B and 12C, which may be, for example, metros or access networks. Multi-protocol Label Switching (MPLS) extends from first area 12A into areas 12B and 12C in accordance with the techniques described herein. AS 10 comprises a collection of network elements, such as routers, switches, links, or other network devices, maintained by, for example, an Internet service provider or other entity.

AS 10 involves a combination of a variety of devices to provide edge-to-edge connectivity from Access Node (AN) 16A to AN 16B. Label switching routers (LSRs) that interconnects regions, e.g., IGP areas 12A-12C ("areas 12"), are referred to herein as Border Nodes (BNs) 20A-20B ("BNs 20"). Examples of BNs include Autonomous System Border Routers (ASBRs) and Area Border Routers (ABRs). As shown in FIG. 1, BNs 20 may be ABRs, because they interconnect areas 12. BNs 20 may have limited service awareness. BNs 20 may act as route reflectors.

LSRs that apply services are referred to herein as Service Nodes (SNs). SNs may have subscriber awareness, such as by a database of authenticated subscribers to logical access point (e.g., VLANs), and/or by service definitions, either locally configured or provided by a Service Helper device, which specifies a relationships to subscribers and required behaviors to be delivered by the SN. SNs may also have topology awareness, in that the SNs need to know the network topology for services that require network validation before delivery. Thus, SNs may need to maintain routing state, but may not need to be a router. SNs may deliver L2 services as well as L3 services and higher. An MPLS-aware SN can use MPLS-TE state to evaluate the ability of the network to deliver an additional service. Service nodes may provide simple services, such as stateless filters, rate limiters, or more complex services, such as IPTV (multicast), deep packet inspection (DPI) capabilities, point-to-point (P2P) control, local call admission control (CAC), and also may provide per-subscriber/per-service accounting. SNs may provide service meeting Quality of Service (QoS) requirements. Examples of SNs include a Layer Three (L3) Virtual Private Network (VPN) Provider Edge (PE) router, a Virtual Private LAN Service (VPLS) PE router, a Broadband Remote Access Servers (BRAS), a Broadband Network Gateways (BNG), a Gateway General Packet Radio Services (GPRS) Support Node (GGSN), a media gateway that handles Voice over Internet Protocol (VoIP), a base station controller, or another network device that provides services.

An Access Node (AN) 16A-16B ("AN 16") is the first or last node at which packets from customers are handled at layer two (L2) or above. Examples of ANs include digital subscriber line access multiplexers (DSLAMs), multi-tenant units (MTUs), towers, cell-site gateways (CSGs), optical line terminals (OLTs), or other network devices. ANs 16 may have one or more customer networks or subscriber networks connected thereto (not shown). Customer devices may include routers, switches, DSL modems, handheld devices, mobile devices, set-top devices, or other customer devices.

Areas 12 may also include one or more Transport Nodes (TNs) (not shown) that are service-unaware LSRs, e.g., Provider routers (P routers). Areas 12 may also include route reflectors. Areas 12 may also include one or more Service Helpers (SHs) (not shown), which are policy and control devices that enable, assist, or direct services. Examples of SHs include Remote Authentication Dial-In User Service (RADIUS) servers, Authentication, Authorization, and Accounting (AAA) servers, Border Gateway Function (BGF) devices, Access-Resource and Admission Control Function (A-RACF) devices, or other policy and control devices.

Edge-to-edge MPLS connectivity across AS 10 is partitioned into several sequences that may be referred to herein as "connectivity segments." The connectivity segments include intra-area label switched paths (LSPs) 14A-14E as well as inter-area LSP 22. In the example of FIG. 1, label distribution messages (e.g., signaling messages for a label distribution protocol such as LDP, RSVP, or labeled-BGP) for forming an LSP are propagated right-to-left ("route flow 15"), while data to be transported along the LSPs are propagated left-to-right ("traffic flow 16").

As will be described, end-to-end MPLS connectivity from AN 16A to AN 16B is achieved without requiring a single end-to-end LSP from AN 16A to AN 16B. ANs 16 require LSPs 14 only to the SNs 18 that serve them, i.e., an AN-to-SN connectivity segment. LSPs 14A and 14E are AN-to-SN connectivity segments. ANs 16 may acquire the necessary MPLS labels by, for example, provisioning, access node control protocol (ANCP), layer two control protocol (L2CP), or any of a plurality of MPLS label distribution protocols (e.g., LDP, RSVP-TE, or BGP).

SN-to-SN connectivity utilizes an SN-to-SN LSP. If the SN-to-SN connectivity consists of multiple connectivity segments, as is the case in AS 10, then a hierarchy of connectivity segments is used. As described in further detail below, a hierarchy of LSPs is formed to provide SN-to-SN connectivity, such that inter-area LSP 22 is established to run over intra-area LSPs 14B, 14C, and 14D within each of areas 12A, 12B, and 12C, respectively. Only the BNs 20 interconnecting the intra-area LSPs 14B, 14C, and 14D have to maintain control and data plane state for the SN-to-SN inter-area LSP 22. Transit nodes (not shown) within each IGP area 12 maintain control and data plane state only for intra-area LSPs 14 within their respective area 12. Such a hierarchy of segments may reduce the overhead required of BNs 20, because the BNs interconnecting the IGP areas 12 need to maintain state only for intra-AS LSPs but not for inter-AS LSPs. In this way, an "exterior route free core" may be maintained for core area 12A.

Connectivity segments provide edge-to-edge connectivity from AN 16A to AN 16B in order to offer a service from a device A (not shown) attached to AN 16A to a device B (not shown) attached to AN 16B. The connectivity segment from AN 16A to SN 18A (LSP 14A) effectively transports packets from device A to SN 18A (and vice versa); the connectivity segment from AN 16B to SN 18B (LSP 14E) effectively transports packets from device B to SN 18B (and vice versa). When a packet from device A arrives at SN 18A, SN 18A applies the required service (e.g., by looking up the packet's destination address in a RFC 4364 VPN Routing and Forwarding (VRF) table, or a VPLS table), and then determines which egress SN (e.g., SN 18B) can further forward the packet to the destination. The connectivity segment from SN 18A to SN 18B is thus used for sending packets between service nodes.

According to the principles of this invention, the connectivity segment from SN 18A to SN 18B is composed of SN-to-BN connectivity segments (e.g., intra-area LSPs 14B, 14D) and BN-to-BN connectivity segments (e.g., intra-area LSP 14C) that are "glued" together using an inter-region label distribution protocol. In accordance with the techniques described herein, BGP is used as an inter-region label distribution protocol where the regions are IGP areas 12. That is, a labeled interior border gateway protocol (iBGP) is used for "gluing" intra-area LSPs 14B, 14C, and 14D to form inter-area LSP 22.

A mechanism for carrying label information in BGP messages is set forth in Y. Rekhter et al., "Carrying Label Information in BGP-4," RFC 3107, May 2001, the entire contents of which are incorporated by reference herein. RFC 3107 generally describes a mechanism for carrying label information in BGP messages, which is sometimes referred to as "labeled BGP." Techniques are described herein which provide additional mechanisms for implementing labeled BGP to establish an inter-area LSP across different areas of a single autonomous system (AS), i.e., for interior BGP (iBGP) to provide end-to-end MPLS connectivity across the different areas. BNs 20 and SNs 18 exchange labeled iBGP route advertisements 24A-24C to establish end-to-end LSP 22.

Different areas 12 may implement different interior routing protocols, such as open shortest path first (OSPF) or intermediate system to intermediate system (IS-IS). In the example of FIG. 1, area 12B utilizes IS-IS, while area 12C utilizes OSPF. Moreover, each of IGP areas 12 may provide individual mechanisms for forming LSPs through the respective IGP area. For example, nodes of each of areas 12B, 12C may implement various and perhaps different MPLS protocols, such as the label distribution protocol (LDP), targeted LDP, resource reservation protocol with traffic engineering extensions (RSVP-TE), or other protocols, to exchanging label distribution messages to advertise labels and form LSPs through the respective area. For example, intra-area LSPs 14A, 14B may be formed using a first protocol, e.g., LDP, while intra-area LSPs 14D, 14E are formed using a second protocol, e.g., RSVP-TE. iBGP as used by SNs 18 and BNs 20 for establishing the end-to-end LSP 22 can be considered as "infrastructure BGP," in that it is used for network connectivity and other infrastructural purposes, and is independent of customers. This is in contrast to "service BGP" which is used for providing services. For example, service BGP may be used for enabling Internet, VPNs, and other services, and is directly related to customer or peering needs.

The hierarchy of LSPs is depicted by various dashed and solid lines, as indicated by key 25. IGP areas 12 may have other transit nodes or other network devices in addition to those shown in FIG. 1, and the dashed and solid lines of FIG. 1 indicate LSPs between devices that may traverse multiple intermediate hops, i.e., devices and physical connections. In order to control traffic flow, ANs 16, SNs 18, and BNs 20 may allocate distinct MPLS labels for segments of these LSPs, as discussed in greater detail in application Ser. No. 12/425,503, to Gredler et al., entitled "Egress Protection for Label Switched Paths," filed on Apr. 17, 2009, the entire contents of which are incorporated by reference herein.

To form an LSP, such as LSP 22, LSRs allocate MPLS labels within a label space and utilize label distribution messages to provide the labels to routers along the LSP. Each LSR may store this information received from other LSR, for example in a routing information base and/or forwarding table. Further, each of ANs 16, SNs 18, and BNs 20 use routing protocols to distribute routing information such as their respective IP addresses and destinations reachable by each of the routers.

BNs 20 and SNs 18 exchange route advertisements 24A-24C to establish end-to-end LSP 22. Routing nodes along a path, such as LSPs 14 and 22, typically generate forwarding tables based on received route advertisements that are used in the data plane to forward traffic, including MPLS packets traversing an LSP. The forwarding tables may include, for example, a destination address or prefix, a label of incoming packets, a label for outgoing packets, label stack operations, such as pushes, swaps and/or pops, and an identifier of a next hop or output interface.

In some embodiments, SNs 18 and BNs 20 may provide bandwidth management across the inter-area LSP 22. SNs 18 and BNs 20 may advertise route advertisements that specify a bandwidth requirement in a "bandwidth attribute" of Network Layer Reachability Information (NLRI) of the route advertisements. For example, SN 18B may indicate in the bandwidth attribute of the labeled iBGP route advertisement 24A that it has 100 Megabits per second (Mbps) of bandwidth available, e.g., because LSP 14D may be a 100 Mbps RSVP-TE LSP. When BN 20B forwards the route advertisement advertising the route for SN 18B, 8N 20B also includes the same value in the bandwidth attribute. BN 20B may subsequently receive request messages to reserve some or all of the 100 Mbps of bandwidth to SN 18B. BN 20B will then keep track of the reservation requests to make sure that the requests do not exceed the 100 Mbps available on the underlying RSVP-TE LSP 14D. This feature may require that RSVP-TE is run in each of areas 12A-12C. In this manner, devices in AS 10 can provide end-to-end bandwidth management without actually running a full end-to-end RSVP-TE LSP, thus improving scalability and easing operations.

The techniques described herein can be used in conjunction with node protection mechanisms that cover failures of LSP tail-end nodes in the presence of LSP hierarchy. Details regarding node protection in the context of inter-region LSPs may be found in application Ser. No. 12/425,503, to Gredler, et al., entitled "Egress Protection for Label Switched Paths," filed on Apr. 17, 2009, the entire contents of which are incorporated by reference herein.

Figure 2:
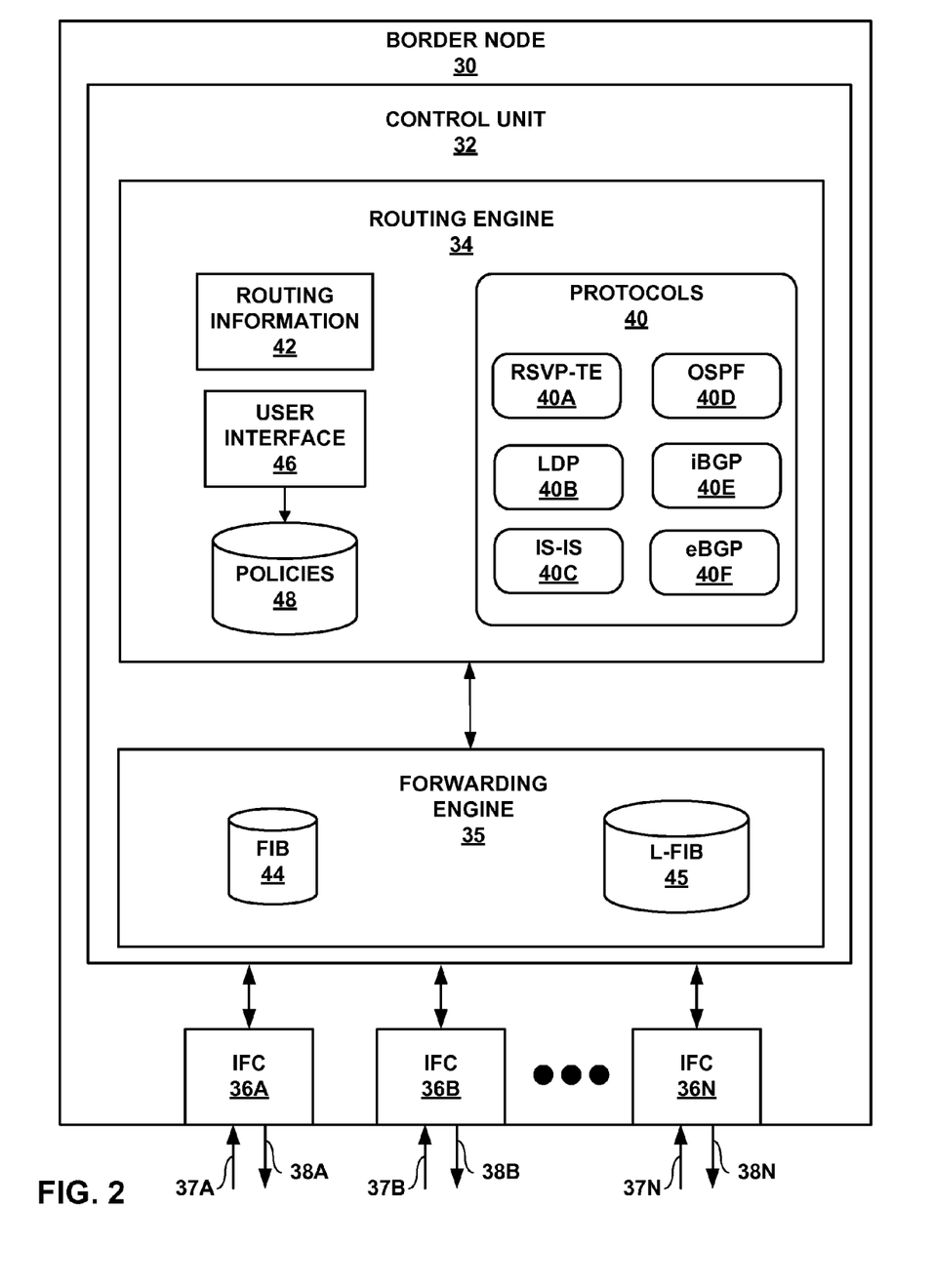
FIG. 2 is a block diagram illustrating an example border node configured to use an interior border gateway protocol (iBGP) as an inter-region label distribution protocol across IGP areas of the same autonomous system.

FIG. 2 is a block diagram illustrating an example border node 30 configured to use an interior border gateway protocol (iBGP) 42 as an inter-region label distribution protocol across IGP areas. In the example of FIG. 2, border node 30 includes interface cards 36A-36N (IFCs 36), for communicating packets via inbound links 37A-37N ("inbound links 37") and outbound links 38A-38N ("outbound links 38"). IFCs 36 are coupled to inbound links 37 and outbound links 38 via a number of interface ports (not shown). Inbound links 37 and outbound links 38 may be physical interfaces.

In the example of FIG. 2, border node 30 includes control unit 32, which includes routing engine 34 and forwarding engine 35. Routing engine 34 is responsible for maintaining and updating routing information 42. Routing information 42 describes a topology of a network, and more particularly, routes through the network. For example, routing information 42 includes route data that describes various routes through the network, and also next hop data indicating appropriate neighboring devices within the network for each of the routes. Routing engine 34 periodically updates routing information 42 to accurately reflect the current network topology.

Routing engine 34 analyzes its stored routing information 42 and generates forwarding information for use by forwarding engine 35. Forwarding engine 35 stores both forwarding information base (FIB) 44 and Label forwarding information base (L-FIB) 45. L-FIB 45 associates labels with next hops for use in forwarding MPLS packets along LSPs. Routing engine 34 may generate FIB 44, L-FIB 45 in the form of a radix tree having leaf nodes that represent destinations within the network. U.S. Pat. No. 7,184,437 provides details on an exemplary embodiment of a router that utilizes a radix tree for route resolution, the contents of which is incorporated herein by reference in its entirety. In other embodiments, other data structures may store a FIB or L-FIB, such as a linked list, an array, a matrix, a tree, or other data structures.

Routing engine 34 also implements various protocols 40, which may comprise software processes having instructions executed by a computing environment. For example, routing engine 34 may implement various routing protocols, such as IS-IS 40C, OSPF 40D, iBGP 40E, and eBGP 40F. Routing engine 34 may implement various label distribution protocols, such as RSVP-TE 40A, LDP 40B, or other label distribution protocols for providing MPLS services. Routing engine 34 may also implement iBGP or eBGP as labeled iBGP or labeled eBGP, i.e., for use in label distribution.

In general, routing engine 34 may comprise one or more of a processor, a programmable processor, a general purpose processor, an integrated circuit, an Application Specific Integrated Circuit (ASIC), a Field Programmable Gate Array (FPGA), or any type of hardware unit capable of implementing the techniques described herein. Routing engine 34 may further include computer readable storage medium, such as dynamic memory (e.g., Random Access Memory or RAM, dynamic RAM or DRAM, and a cache) and/or static memory (e.g., static RAM or SRAM, a Read Only Memory or ROM, and Flash memory), and storage devices, such as Compact Disc ROMs or CDROMs, hard drives, RAM drives, and Digital Video Disc (DVD) drives. In some instances, the computer-readable storage medium may include instructions that cause a programmable processor to perform the techniques described herein. Moreover, forwarding engine 35 may be provided by dedicated forwarding integrated circuits normally associated with high-end routing components of a network router. Consequently, border node 30 may use routing engine 34 and forwarding engine 35 to operate as a high-end router. Border node 30 may be, for example, an area border router (ABR) on a border of a core area of an autonomous system such as AS 10 of FIG. 1. Border node 30 may be, for example, one of BNs 20 of FIG. 1. Border node 30 may have limited service awareness.

iBGP 40E may generate an iBGP route advertisement to be sent by border node 30 to a SN or another BN. The route advertisement is consistent with the labeled BGP format set forth in RFC 3107. The route advertisement specifies a destination, a label to apply for sending traffic to the destination, and a next hop to which to output the labeled traffic towards the destination. iBGP 40E may also process a labeled iBGP route advertisement received by border node 30. When iBGP 40E receives such a labeled iBGP route advertisement, iBGP 40E resolves the next hop specified in the route advertisement to a previously-established LSP to the next hop. The previously-established LSP may have been established by another label distribution protocol running on border node 30, such as RSVP-TE 40A or LDP 40B. iBGP 40E may resolve the next hop with reference to FIB 44 and/or L-FIB 45 maintained by forwarding engine 35. iBGP 40E installs L-FIB state to L-FIB 45 based on the resolved next hop, to install a Forwarding Equivalence Class (FEC)-label mapping for use by border node 30 in forwarding subsequent MPLS traffic to the destination.

iBGP 40E may also refer to policies 48 to determine whether to propagate a received iBGP route advertisement to another IGP area, e.g., based on community values carried in NLRI fields of the iBGP route advertisement. Policies 48 may be access and control policies specified by a network administrator via user interface 46. Policies 48 may specify restrictions on communications across IGP areas, such as particular types of communications or traffic that are allowed or are not allowed into particular IGP areas. Policies 48 may be employed to prevent leaking of destination addresses across IGP areas. As one example, assume SN 18A in area 12B is configured to provide VPLS services, whereas area 12C does not use VPLS. BN 20B may decide not to advertise a route advertisement received from SN 18A when the route advertisement indicates a community associated with VPLS, because BN 20B is configured with policies that specify that VPLS services are not to be allowed into area 12B as they are not needed.

Figure 3:
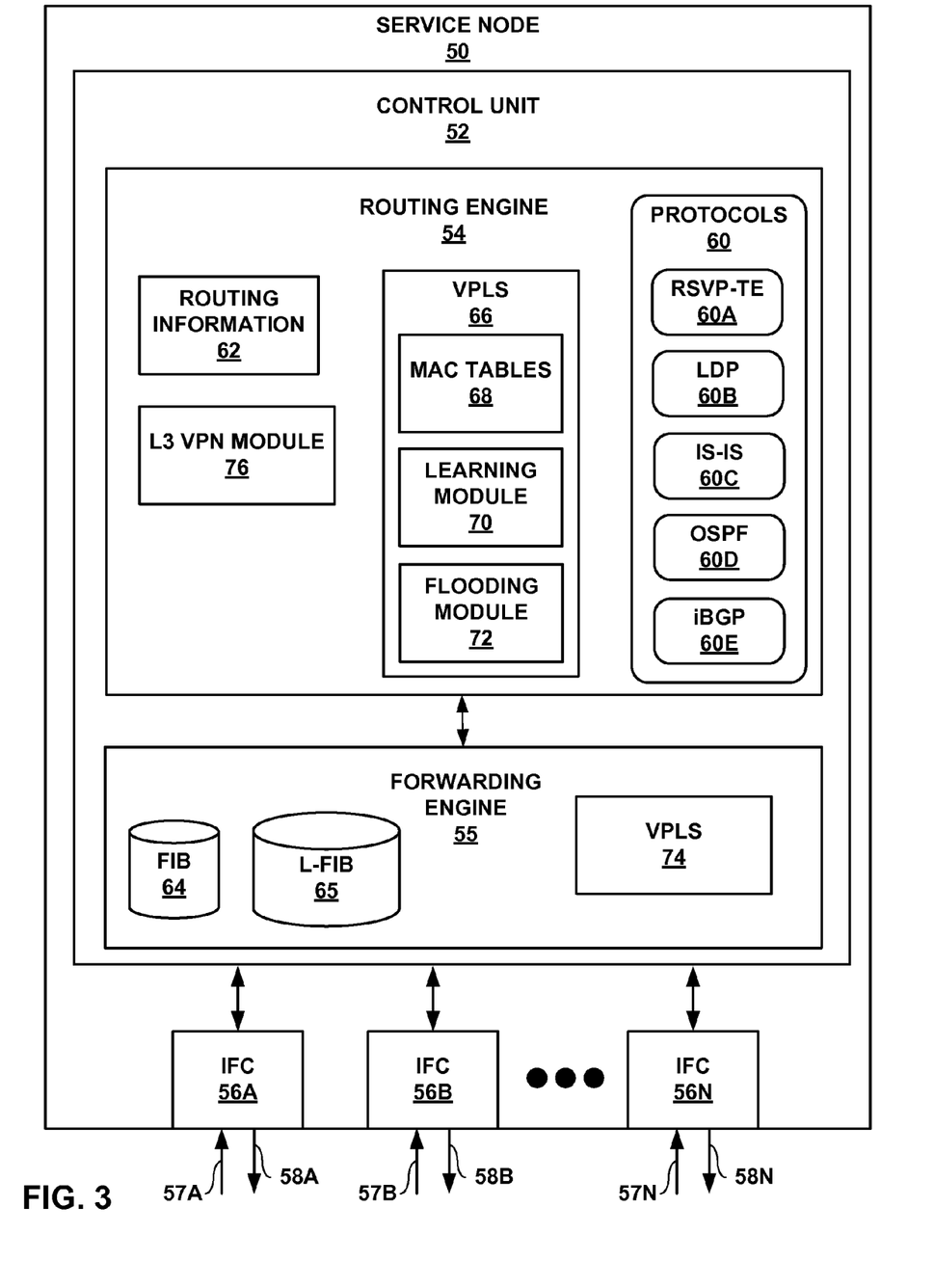
FIG. 3 is a block diagram illustrating an example service node configured to interact with a border node that uses iBGP as an inter-region label distribution protocol across IGP areas of the autonomous system.

FIG. 3 is a block diagram illustrating an example service node 50 configured to use iBGP as an inter-region label distribution protocol across IGP areas to exchange label distribution messages with a border node for establishing an inter-area LSP across the IGP areas. In the example of FIG. 3, service node 50 includes several features that are similar to that of border node 40 of FIG. 2.

For example, iBGP 60E may generate an iBGP route advertisement to be sent by service node 50 to a BN. The route advertisement is consistent with the labeled BGP format set forth in RFC 3107. The route advertisement specifies a destination, a label to apply for sending traffic to the destination, and a next hop to which to output the labeled traffic towards the destination. Service node 50 may specify the label as "implicit null." In this manner, service node 50 may initiate establishment of a SN-to-SN, inter-area LSP in order to connect to other SNs within AS 10 (including to all other SNs in AS 10), without requiring a full mesh of LSPs between all ANs in AS 10. Service node 50 may also include one or more community identifiers in NLRI of the generated route advertisement to indicate to other devices along inter-area LSP 22 the nature of services provided by service node 50.

iBGP 60E may also process a labeled iBGP route advertisement received by service node 50. When iBGP 60E receives such a labeled iBGP route advertisement, iBGP 60E resolves the next hop specified in the route advertisement to a previously-established LSP to the next hop. The previously-established LSP may have been established by another label distribution protocol running on service node 50, such as RSVP-TE 60A or LDP 60B. iBGP 60E may resolve the next hop with reference to FIB 44 and/or L-FIB 45 maintained by forwarding engine 55. iBGP 60E installs L-FIB state to L-FIB 65 based on the resolved next hop, to install a FEC-label mapping for use by service node 50 in forwarding subsequent MPLS traffic to the destination.

At service node 50, AN-to-SN connectivity segments (e.g., intra-area LSPs 14A, 14E) are "glued" to SN-to-SN/SN-to-BN connectivity segments (e.g., inter-area LSP 22 running over intra-area LSPs 14B, 14C, 14E) using a particular service instance, e.g., associated with a RFC 4364 VPN Routing and Forwarding (VRF), or a VPLS Edge (VE) device.

In addition to iBGP route advertisements (messages) used for infrastructural purposes (e.g., to build inter-area LSPs), iBGP may also be used for service purposes (e.g., for RFC 4364 VPNs, Internet routing or VPLS). Service node 50 may execute various software modules for providing services within a network. For example, service node 50 includes VPLS module 66 in routing engine 54 and VPLS module 74 in forwarding engine 74. Service node 50 may employ VPLS modules 66, 74 to provide VPLS services to devices within an IGP area 12. Media Access Control (MAC) table 68 may store L2 state data associated with one or more VPLS domains. VPLS module 66 includes learning module 70 and flooding module 72 configured to perform VPLS flooding and learning. Examples of devices configured to provide VPLS services may be found in U.S. patent application Ser. No. 12/246,810, entitled "INTER-AUTONOMOUS SYSTEM (AS) VIRTUAL PRIVATE LOCAL AREA NETWORK SERVICE (VPLS)," filed on Oct. 7, 2008, and K. Kompella et al., "Virtual Private LAN Service (VPLS) using BGP for Auto-Discovery and Signaling," RFC 4761, January 2007, the entire contents of each of which are incorporated herein by reference.

Service node 50 also includes L3 VPN module 76 for providing L3 VPN services. Examples of devices configured to provide L3 VPN services may be found in U.S. Pat. No. 7,564,806, entitled "Aggregate Multicast Trees for Multicast Virtual Private Networks," the entire contents of which are incorporated by reference herein. SN 50 may choose to have several instances of iBGP 60E, or may separate infrastructure uses from service uses by other means.

Service node 50 may be similar to SNs 18 of FIG. 1. Service node 50 may comprise, for example, a Layer Three (L3) Virtual Private Network (VPN) Provider Edge (PE) router, a Virtual Private LAN Service (VPLS) PE router, a Broadband Remote Access Servers (BRAS), a Broadband Network Gateways (BNG), a Gateway General Packet Radio Services (GPRS) Support Node (GGSN), a media gateway that handles Voice over Internet Protocol (VoIP), a base station controller, or another network device that provides services.

Figure 4:
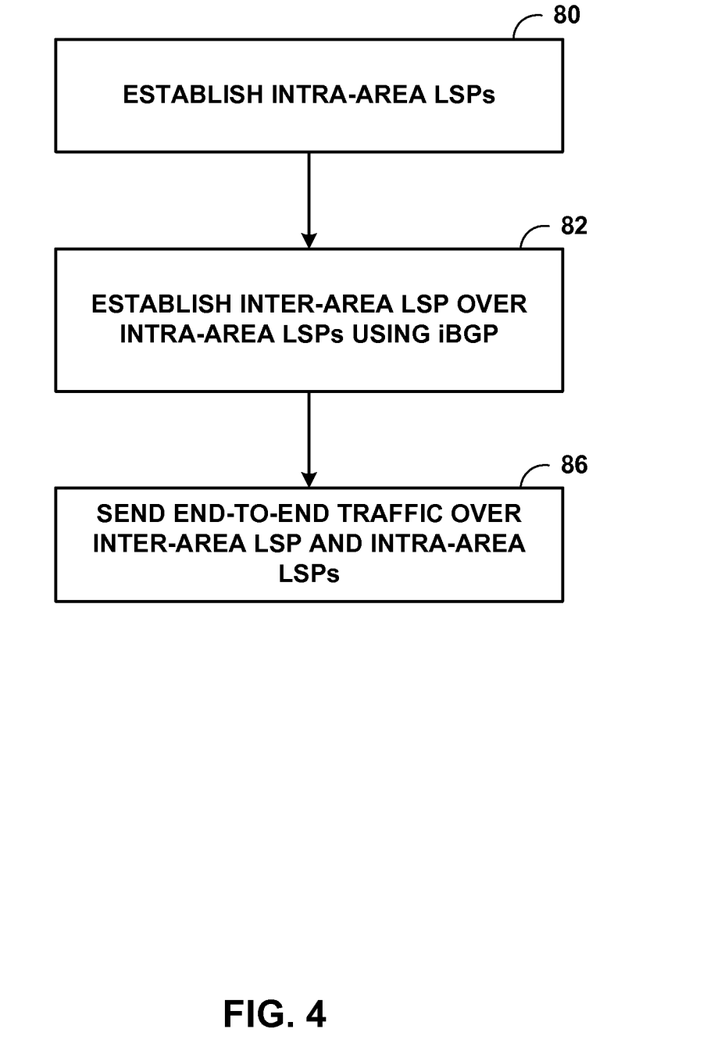
FIG. 4 is a flowchart illustrating an example process for sending traffic over an inter-area LSP.

FIG. 4 is a flowchart illustrating an example process for sending traffic over an inter-area LSP of an AS, such as inter-area LSP of FIG. 1. LSRs within the AS establish intra-area LSPs 14 using various label distribution protocols (80). As discussed above, intra-area LSPs 14 within different areas 12 may use different label distribution protocols for establishing the intra-area LSPs. BNs 20 and SNs 18 also establish inter-area LSP 22 (82), as described in further detail below with respect to FIG. 5. In some cases, when an underlying intra-area LSP 14 does not already exist at the time of establishing an inter-area LSP 22, LSRs may initiate establishment of an intra-area LSP 14, which will then be used for running the inter-area LSP over the top. After inter-area LSP 22 is established between SNs 18, ANs 14 may then send end-to-end traffic over the intra-area LSPs 14 and inter-area LSP 22 (86).

Figure 5:
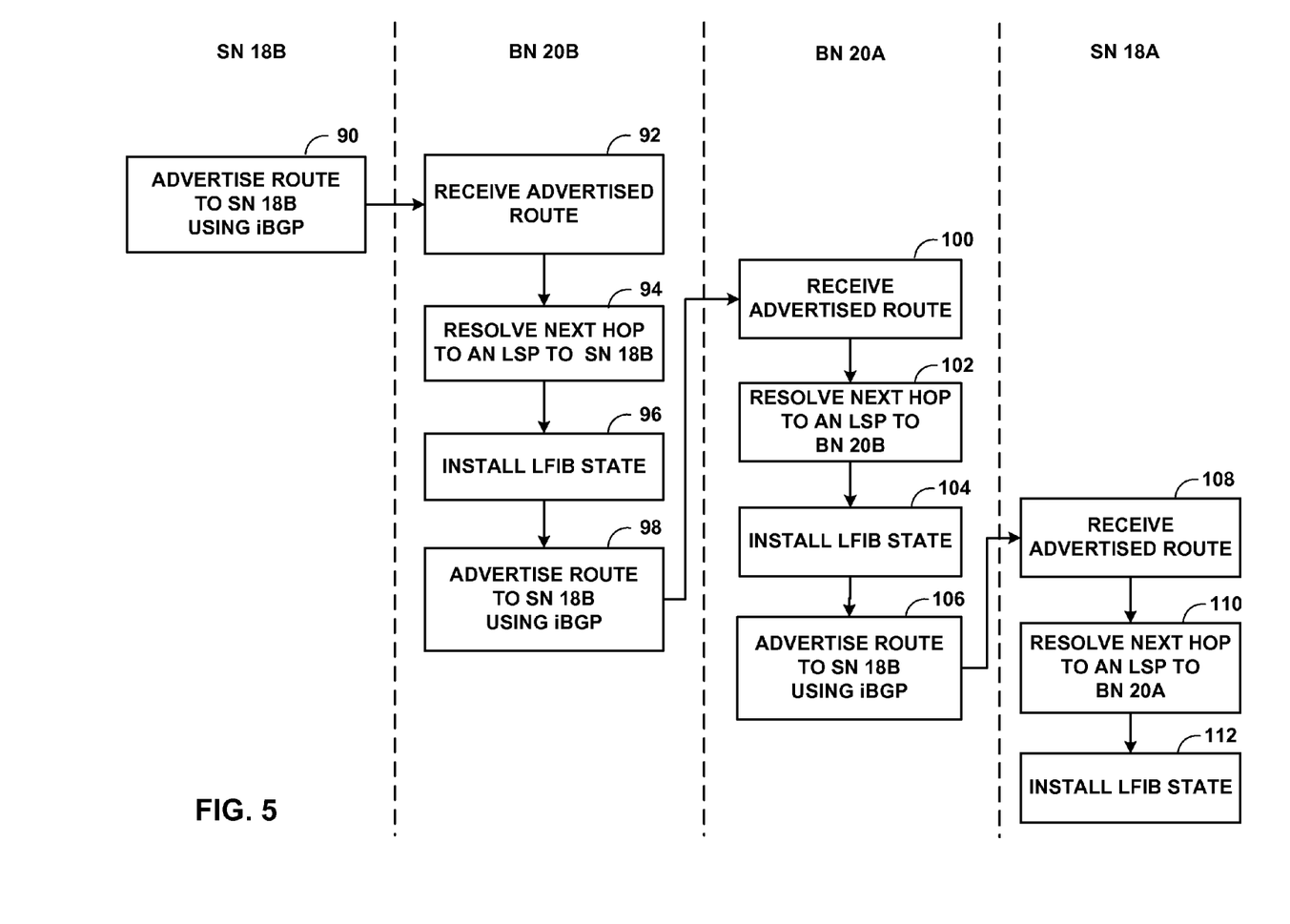
FIG. 5 is a flowchart illustrating an example process for establishing an inter-area LSP over a plurality of intra-area LSPs.

FIG. 5 is a flowchart illustrating an example process for establishing an inter-area LSP over a plurality of intra-area LSPs. FIG. 5 will be described relative to FIG. 6, which is a block diagram illustrating example label distribution messages and route advertisements in the example autonomous system of FIG. 1.

Figure 6:
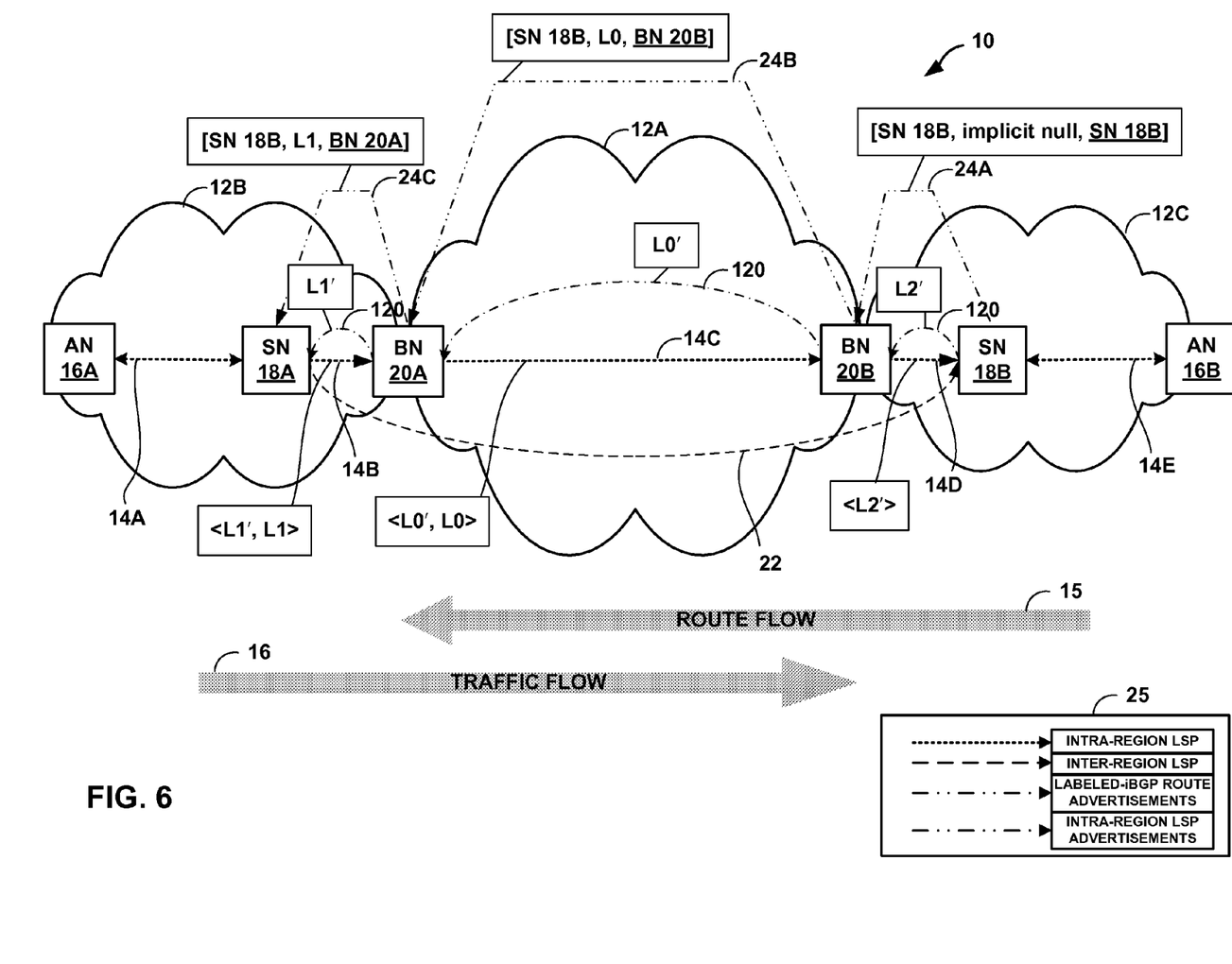
FIG. 6 is a block diagram illustrating example label distribution messages and route advertisements in the example autonomous system of FIG. 1.

In the following example, a BGP route to destination D with label L and Next-Hop N is denoted by [D, L, N]. Intra-area LSPs 14B, 14C, and 14D have already been established, with the following label assignments: in area 12B, from SN 18A to 8N 20A, use label L1'; in area 12A, from BN 20A to BN 20B, use label L0'; in area 12C, from BN 20B to SN 18B, use label L2'. These label assignments are communicated by intra-region LSP advertisements 120, as shown in FIG. 6.

SN 18B advertises to BN 20B on the border of area 12C, via iBGP, a route 24A to SN 18B (90). Specifically, the route 24A specifies [SN 18B, implicit null, SN 18B]. BN 20B receives the advertised route 24A from SN 18B (92). BN 20B resolves the next hop SN 18B to the previously established LSP 14D to SN 18B (94), i.e., to label L2'. Now BN 20B can reach SN 18B via label stack <L2'>, as illustrated in FIG. 6. Note that the implicit null label does not appear in the label stack. BN 20B allocates a label L0 and installs LFIB state to swap <L0> to <L2'>(96). BN 20B advertises to BN 20A in area 12A, via iBGP, a route 24B to SN 18B (98). The route 24B specifies [SN 18B, L0, BN 20B].

BN 20A receives the advertised route 24B from BN 20B (100). BN 20A resolves the next hop BN 20B to the previously established area 12A LSP 14C (in area 12A) to BN 20B (102), i.e., to label L0'. Now BN 20A can reach SN 18B by using label stack <L0', L0>. BN 20A allocates label L1 and installs LFIB state to swap <L1> to <L0', L0> (104). BN 20A advertises to SN 18A in area 12B, via iBGP, a route 24C to SN 18B (106). The route 24C specifies [SN 18B, L1, BN 20A].

SN 18A receives the advertised route 24C from BN 20A (108). SN 18A resolves the next-hop BN 20A to LSP 14B (in area 12B) to BN 20A, i.e., label L1' (110). Now SN 18A can reach SN 18B by using the label stack <L1', L1>. SN 18A installs LFIB state indicating to push label stack <L1', L1> to reach SN 18B (112). Network traffic flowing from SN 18A to SN 18B over LSP 22 will have a two-label stack according to the LSP hierarchy. Within this two-label stack there may also be additional labels, such as for VPLS, pseudowires, IP VPNs, or other purposes.

In this manner, SN 18B may initiate establishment of a SN-to-SN, inter-area LSP in order to connect to other SNs within AS 10 (including to all other SNs in AS 10), without requiring a full mesh of LSPs between all ANs in AS 10. This allows for extending MPLS from core area 12A into metro or access network areas 12B, 12C in a scalable manner.

Figure 7:
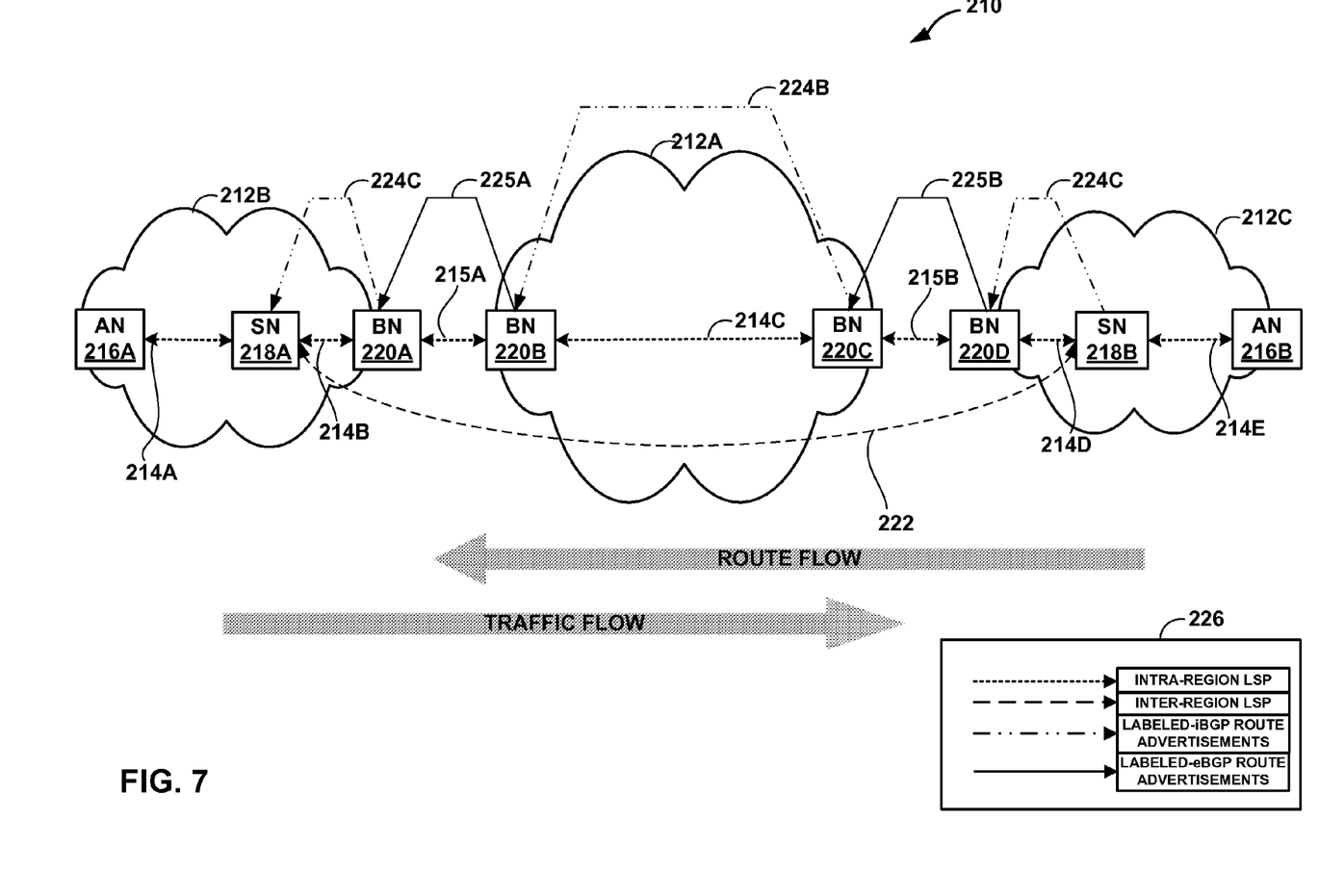
FIG. 7 is a block diagram illustrating an example system in which an inter-area LSP is established that extends from a first area into one or more other areas across multiple autonomous systems.

FIG. 7 is a block diagram illustrating an example system 210 in which an inter-region LSP 222 is established that extends from a first region 212B into one or more other regions 212A and 212C. In the example of FIG. 7, the regions 212A-212C ("regions 212") of system 210 are different autonomous systems. Regions 212, as ASes, may also be partitioned further into IGP areas (not shown). The hierarchy of LSPs is depicted by various dashed and solid lines, as indicated by key 226.

BN-to-BN segments that span different ASes 212, e.g., LSPs 215A-215B, may be established using labeled exterior Border Gateway Protocol (eBGP). BNs 220A-220D border different ASes 212. BNs 220B and 220D send labeled eBGP route advertisements 225A-225B. BNs 220A, 220C, and SN 218A send labeled iBGP route advertisements 224A-224C. In addition, connectivity segments within system 210 may be hierarchical, in a manner similar to that described above. For example, connectivity segments within an SN-to-BN segment within an AS 212 that consists of multiple IGP areas are realized via a sequence of segments. As another example, BN-to-BN segments within an AS 212 that consists of multiple IGP areas are realized via a sequence of segments. In this manner, a hierarchy of segments (e.g., LSPs) is realized using LSP hierarchy to provide end-to-end MPLS connectivity from AN 216A to AN 216B across multiple ASes 212, where each of the ASes 212 may include multiple IGP areas. The segments may comprise intra-area LSPs 214A-214E.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described herein may also be embodied in a computer readable medium containing instructions. Instructions embedded in a computer readable medium may cause a programmable processor, or other processor, to perform the method, e.g. when the instructions are executed. A computer readable medium may be a computer readable storage medium. Computer readable storage media may include, for example, random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Although described primarily with respect to the multiprotocol label switching (MPLS) protocol, it should be understood that the techniques of this disclosure may be applied to any networking system that uses encapsulation layers and switched paths. For example, the techniques of this disclosure may be applied to provider backbone bridges (as described in the IEEE 802.1 ah-2008 standard), provider backbone bridge traffic engineering (as described in the IEEE 802.1Qay), transport MPLS, MPLS transport profile, or other label switching protocols or techniques for enabling virtual private networks.

Various embodiments of the invention have been described. These and other embodiments are within the scope of the following claims.

The invention claimed is:

1. A method comprising:
executing a first label distribution protocol at a border node positioned at a border between two of a plurality of interior gateway protocol (IGP) areas of a single autonomous system (AS);
exchanging label distribution messages using the first label distribution protocol to establish a first intra-area label switched path (LSP) within a first one of the plurality of IGP areas;
executing a labeled interior border gateway protocol (iBGP) at the border node;
establishing, with the labeled iBGP, an iBGP peering session between the border node and a node associated with the first IGP area of the AS; and
exchanging label distribution messages directly between the border node and the node associated with the first IGP area of the AS over the iBGP peering session using the labeled interior border gateway protocol to establish a hierarchical inter-area LSP that transports traffic over the previously established first intra-area LSP, wherein the hierarchical inter-area LSP extends across the plurality of IGP areas of the AS,
wherein exchanging label distribution messages using the labeled interior gateway protocol comprises with the border node, receiving a first labeled interior border gateway protocol route advertisement over the iBGP peering session, wherein the route advertisement specifies a route to a destination within a first IGP area of the AS and a label to use for reaching the destination.

2. The method of claim 1, further comprising:
with the border node, in response to receiving the first labeled interior border gateway protocol route advertisement,
resolving the route to a second intra-area LSP previously established within a second one of the IGP areas.

3. The method of claim 2, wherein resolving the route to the second intra-area LSP comprises determining a label associated with the second intra-area LSP, further comprising:
installing forwarding state to the border node that specifies the label associated with the second intra-area LSP and the label associated with the first intra-area LSP.

4. The method of claim 2, further comprising:
prior to exchanging the label distribution messages using the labeled interior border gateway protocol, exchanging label distribution messages using the first label distribution protocol to establish the second intra-area LSP within the second IGP area of the AS.

5. The method of claim 2, further comprising:
prior to exchanging the label distribution messages using the labeled interior border gateway protocol, exchanging label distribution messages using a second label distribution protocol different than the first label distribution protocol to establish the second intra-area LSP within the second IGP area of the AS.

6. The method of claim 5, wherein devices in the first IGP area are configured to run the first label distribution protocol and are not configured to run the second label distribution protocol, and wherein devices in the second IGP area are configured to run the second label distribution protocol and are not configured to run the first label distribution protocol.

7. The method of claim 5, wherein the first label distribution protocol comprises RSVP-TE, and wherein the second label distribution protocol comprises the Label Distribution Protocol (LDP).

8. The method of claim 2, wherein the first IGP area comprises an access network of the AS, and wherein the second IGP area comprises a backbone area of the AS.

9. The method of claim 2, wherein the first IGP area comprises a backbone area of the AS, and wherein the second IGP area comprises an access network of the AS.

10. The method of claim 1, wherein receiving the first labeled interior border gateway protocol route advertisement comprises receiving the first labeled interior border gateway protocol route advertisement from a service node within the first IGP area, wherein the node associated with the first IGP area comprises the service node,
wherein the route to the destination comprises a route to the service node, and
wherein the label specified within the interior border gateway protocol route advertisement comprises an implicit null label.

11. The method of claim 1, wherein receiving the first labeled interior border gateway protocol route advertisement comprises receiving the first labeled interior border gateway protocol route advertisement from a second border node associated with the first IGP area, wherein the node associated with the first IGP area comprises the second border node,
wherein the route to the destination comprises a route to a service node within the first IGP area, and
wherein the label specified within the interior border gateway protocol route advertisement comprises a label allocated by the second border node for forwarding packets over the inter-area LSP.

12. The method of claim 1, wherein the route comprises an Internet Protocol address associated with the destination.

13. The method of claim 1, further comprising:
with the border node, upon receiving the first labeled interior border gateway protocol route advertisement, generating a second labeled interior border gateway protocol route advertisement, wherein the second labeled interior border gateway protocol route advertisement advertises a label allocated by the border node for forwarding packets over the inter-area LSP; and
outputting the second labeled interior border gateway protocol route advertisement to an interior border gateway protocol peer.

14. The method of claim 1, further comprising:
maintaining policies that specify restrictions on communications across IGP areas, wherein the policies are expressed in terms of community identifiers,
wherein exchanging the label distribution messages using the labeled interior border gateway protocol comprises exchanging label distribution messages that specify a community identifier in network layer reachability information (NLRI) fields of the label distribution messages;
comparing the community identifier specified in the label distribution messages to the maintained policies; and
determining whether to forward the received labeled interior border gateway protocol route advertisement to one of the plurality of IGP areas based on the comparison.

15. The method of claim 1,
wherein executing the first label distribution protocol comprises executing the Resource Reservation Protocol with Traffic Engineering extensions (RSVP-TE),
wherein the first intra-area LSP comprises an intra-area RSVP-TE LSP, and
wherein exchanging the label distribution messages using the labeled interior border gateway protocol comprises exchanging label distribution messages that specify an amount of required bandwidth in network layer reachability information (NLRI) fields of the label distribution messages.

16. The method of claim 15, further comprising:
upon receiving a label distribution message that specifies the amount of required bandwidth, reserving bandwidth along the intra-area RSVP-TE LSP based on the specified amount of required bandwidth.

17. The method of claim 1, wherein the border node acts as a route reflector for one or more of the plurality of IGP areas.

18. The method of claim 17, further comprising:
with the border node, changing a next hop attribute and a label associated with received interior border gateway protocol messages prior to sending the interior border gateway protocol messages to router reflector clients of the border node.

19. A border node comprising:
a physical interface for receiving packets from a network;
a control unit that executes a first label distribution protocol software process and a labeled interior border gateway protocol (iBGP) software process; and
a packet forwarding engine configured to maintain forwarding information that associates network destinations with next hops in the network,
wherein the control unit executes the first label distribution protocol software process to exchange label distribution messages in accordance with a first label distribution protocol to establish a first intra-area label switched path (LSP) within a first interior gateway protocol (IGP) area of a plurality of IGP areas of a single autonomous system (AS),
wherein the control unit executes the labeled interior border gateway protocol software process to establish an iBGP peering session between the border node and a node associated with the first IGP area of the AS,
wherein the control unit executes the labeled interior border gateway protocol software process to exchange label distribution messages directly between the border node and the node associated with the first IGP area of the AS over the iBGP peering session in accordance with a labeled interior border gateway protocol to establish a hierarchical inter-area LSP that transports traffic over the previously established first intra-area LSP, wherein the hierarchical inter-area LSP extends across the plurality of IGP areas of the AS,
wherein the physical interface receives a first labeled interior border gateway protocol route advertisement from the node over the iBGP peering session that specifies a route to a destination within a first IGP area of the AS and a label to use for reaching the destination.

20. The border node of claim 19,
wherein the control unit executes the labeled interior border gateway protocol software process to resolve the route to a second intra-area LSP previously established within a second one of the IGP areas, determine a label associated with the second intra-area LSP, and install forwarding state to the forwarding information that specifies the label associated with the second intra-area LSP and the label associated with the first intra-area LSP.

21. The border node of claim 20,
wherein the first labeled interior border gateway protocol route advertisement is received from a service node within the first IGP area, wherein the node associated with the first IGP area comprises the service node,
wherein the route to the destination comprises a route to the service node, and
wherein the label specified within the interior border gateway protocol route advertisement comprises an implicit null label.

22. The border node of claim 20,
wherein the first labeled interior border gateway protocol route advertisement is received from a second border node associated with the first IGP area, wherein the node associated with the first IGP area comprises the second border node,
wherein the route to the destination comprises a route to a service node within the first IGP area, and
wherein the label specified within the interior border gateway protocol route advertisement comprises a label allocated by the second border node for forwarding packets over the inter-area LSP.

23. The border node of claim 19, wherein the route comprises an Internet Protocol address associated with the destination.

24. The border node of claim 19, wherein, responsive to receiving the first labeled interior border gateway protocol route advertisement, the control unit executes the labeled interior border gateway protocol software process to generate a second labeled interior border gateway protocol route advertisement, wherein the second labeled interior border gateway protocol route advertisement advertises a label allocated by the border node for forwarding packets over the inter-area LSP, and
wherein the control unit executes the labeled interior border gateway protocol software process to output the second labeled interior border gateway protocol route advertisement to an interior border gateway protocol peer.

25. The border node of claim 19,
wherein the control unit maintains a policy database storing policies that specify restrictions on communications across IGP areas, wherein the policies are expressed in terms of community identifiers,
wherein the control unit executes the labeled interior border gateway protocol software process to exchange label distribution messages in accordance with a labeled interior border gateway protocol that specify a community identifier in network layer reachability information (NLRI) fields of the label distribution messages, compare the community identifier specified in the label distribution messages to the maintained policies, and determine whether to forward the received labeled interior border gateway protocol route advertisement to one of the plurality of IGP areas based on the comparison.

26. The border node of claim 19,
wherein the first label distribution protocol comprises the Resource Reservation Protocol with Traffic Engineering extensions (RSVP-TE),
wherein the first intra-area LSP comprises an intra-area RSVP-TE LSP, and
wherein the control unit executes the labeled interior border gateway protocol software process to exchange label distribution messages in accordance with a labeled interior border gateway protocol that specify an amount of required bandwidth in network layer reachability information (NLRI) fields of the label distribution messages.

27. The border node of claim 26, wherein the upon receiving a label distribution message that specifies the amount of required bandwidth, the control unit executes the labeled interior border gateway protocol software process to instruct the RSVP-TE to reserve bandwidth along the intra-area RSVP-TE LSP based on the specified amount of required bandwidth.

28. The border node of claim 19, wherein the border node acts as a route reflector for one or more of the plurality of IGP areas, and wherein the border node changes a next hop attribute and a label associated with received interior border gateway protocol messages prior to sending the interior border gateway protocol messages to router reflector clients of the border node.

29. A service node comprising:
a physical interface for receiving packets from a network;
a control unit that executes a first label distribution protocol software process and a labeled interior border gateway protocol (iBGP) software process; and
a packet forwarding engine configured to maintain forwarding information that associates network destinations with next hops in the network,
wherein the control unit executes the first label distribution protocol software process to exchange label distribution messages in accordance with a first label distribution protocol to establish a first intra-area label switched path (LSP) within a first interior gateway protocol (IGP) area of a plurality of IGP areas of a single autonomous system (AS),
wherein the control unit executes the labeled interior border gateway protocol software process to establish an iBGP peering session between the service node and a node associated with the first IGP area of the AS,
wherein the control unit executes the labeled interior border gateway protocol software process to generate a label distribution message in accordance with a labeled interior border gateway protocol, and to send the label distribution message directly between the border node and the node associated with the first IGP area of the AS over the iBGP peering session to initiate establishment of a hierarchical inter-area LSP that transports traffic over the previously established first intra-area LSP, wherein the hierarchical inter-area LSP extends across the plurality of IGP areas of the AS, wherein the label distribution message comprises a first labeled interior border gateway protocol route advertisement that specifies a route to a destination within a first IGP area of the AS and a label to use for reaching the destination.

30. The service node of claim 29,
wherein the control unit executes a virtual private LAN service (VPLS) module to provide VPLS services to devices within the first IGP area.

31. The service node of claim 29,
wherein the control unit executes a layer three (L3) virtual private network (VPN) module to provide L3 VPN services to devices within the first IGP area.

32. A non-transitory computer-readable medium comprising instructions for causing a programmable processor to:
execute a first label distribution protocol software process at a border node positioned at a border between two of a plurality of interior gateway protocol (IGP) areas of a single autonomous system (AS);
exchange label distribution messages in accordance with a first label distribution protocol using the first label distribution protocol software process to establish a first intra-area label switched path (LSP) within a first one of IGP areas;
execute a labeled interior border gateway protocol (iBGP) software process at the border node;
establish an iBGP peering session between the border node and a node associated with the first IGP area of the AS;
exchange label distribution messages directly between the border node and the node associated with the first IGP area of the AS over the iBGP peering session in accordance with a labeled interior border gateway protocol using the labeled interior border gateway protocol software process to establish a hierarchical inter-area LSP that transports traffic over the previously established first intra-area LSP, wherein the hierarchical inter-area LSP extends across the plurality of IGP areas of the AS; and
receive a first labeled interior border gateway protocol route advertisement over the BGP peering session, wherein the route advertisement specifies a route to a destination within a first IGP area of the AS and a label to use for reaching the destination.

33. The non-transitory computer-readable medium of claim 32, wherein the instructions cause the processor to:
resolve the route to a second intra-area LSP previously established within a second one of the IGP areas;
determine a label associated with the second intra-area LSP; and
install forwarding state to the border node that specifies the label associated with the second intra-area LSP and the label associated with the first intra-area LSP.

34. A system comprising:
a first service node within a first interior gateway protocol (IGP) area of a plurality of IGP areas of a single autonomous system (AS); and
a first border node in communication with the first service node, wherein the first border node is positioned at a border between the first IGP area and a second IGP area of the plurality of IGP areas, wherein the first border node comprises:
a physical interface for receiving packets from the first service node and outputting packets to the first service node;
a control unit that executes a first label distribution protocol software process and a labeled interior border gateway protocol (iBGP) software process;
a packet forwarding engine configured to maintain forwarding information that associates network destinations with next hops in the network,
wherein the first label distribution protocol software process is configured to exchange label distribution messages with the first service node to establish a first intra-area label switched path (LSP) to the first service node,
wherein the labeled interior border gateway protocol is configured to establish an iBGP peering session between the border node and the first service node and exchange label distribution messages in accordance with a labeled interior border gateway protocol directly with the first service node over the iBGP peering session in accordance with a labeled interior border gateway protocol to establish a hierarchical inter-area LSP that transports traffic over the previously established first intra-area LSP, wherein the hierarchical inter-area LSP extends across the plurality of IGP areas of the AS
wherein the physical interface is configured to receive a first labeled interior border gateway protocol route advertisement from the service node over the iBGP peering session that specifies a route to a destination within a first IGP area of the AS and a label to use for reaching the destination.

35. The system of claim 34, further comprising:
a second border node in communication with the first border node, wherein the second border node is positioned along the hierarchical inter-area LSP.

36. The system of claim 34, further comprising:
a first access node that provides access to the first IGP area, wherein the first access node is in communication with the first service node;
a second access node that provides access to a third IGP area of the plurality of IGP areas;
a second service node within the third IGP area, wherein the second access node is in communication with the second service node, wherein the second service node is in communication with the second border node
wherein the first access node transports packets from a first customer device coupled to the first access node to a second customer device coupled to the second access node via the hierarchical inter-area LSP.

37. The system of claim 36, wherein the first service node applies one or more services to the packets and forwards the packets to the second service node via a connectivity segment of the hierarchical inter-area LSP that extends between the first service node and the second service node.

* * * * *